(12) United States Patent
Hymes

(10) Patent No.: US 9,874,882 B2
(45) Date of Patent: Jan. 23, 2018

(54) AUTOMATIC SMART WATERING APPARATUS

(71) Applicant: Ron Hymes, San Juan Capistrano, CA (US)

(72) Inventor: Ron Hymes, San Juan Capistrano, CA (US)

(*) Notice: Subject to any disclaimer, the term of this patent is extended or adjusted under 35 U.S.C. 154(b) by 315 days.

(21) Appl. No.: 14/663,905

(22) Filed: Mar. 20, 2015

(65) Prior Publication Data

US 2015/0192933 A1 Jul. 9, 2015

Related U.S. Application Data

(63) Continuation-in-part of application No. 13/334,005, filed on Dec. 21, 2011, now Pat. No. 9,066,496, which is a continuation-in-part of application No. 11/977,194, filed on Oct. 24, 2007, now abandoned.

(60) Provisional application No. 60/862,714, filed on Oct. 24, 2006.

(51) Int. Cl.
*F16K 31/38* (2006.01)
*A01K 7/02* (2006.01)
*G05D 9/12* (2006.01)

(52) U.S. Cl.
CPC ............... *G05D 9/12* (2013.01); *A01K 7/02* (2013.01); *Y10T 137/7287* (2015.04); *Y10T 137/7306* (2015.04)

(58) Field of Classification Search
CPC .. G05D 9/12; G05D 9/00; G05D 9/02; G05D 9/04; A01K 7/02; A01K 39/029; Y10T 137/7287; Y10T 137/7306

USPC ................ 137/624.12, 392; 119/74, 77
See application file for complete search history.

(56) References Cited

U.S. PATENT DOCUMENTS

| | | | |
|---|---|---|---|
| 399,418 A | 3/1889 | Langdon | |
| 1,346,898 A | 7/1920 | Kingsbury | |
| 3,650,247 A * | 3/1972 | McKinstry | A01K 39/022 119/81 |
| 5,038,820 A | 8/1991 | Ames et al. | |
| 5,284,173 A * | 2/1994 | Graves | A01K 7/02 119/74 |
| 5,452,683 A * | 9/1995 | Poffenroth | A01K 7/027 119/73 |
| 5,813,363 A * | 9/1998 | Snelling | A01K 7/027 119/73 |
| 5,842,437 A * | 12/1998 | Burns | A01K 7/00 119/74 |
| 6,877,170 B1 | 4/2005 | Quintana et al. | |
| 6,926,028 B2 | 8/2005 | Murray et al. | |
| 8,464,661 B1 * | 6/2013 | Dunn | A01K 7/02 119/73 |
| 2005/0241589 A1 | 11/2005 | Forster | |
| 2005/0279287 A1 * | 12/2005 | Kroeker | A01K 7/00 119/72 |
| 2008/0092965 A1 | 4/2008 | Hymes | |
| 2008/0257274 A1 * | 10/2008 | Drouillard | A01K 7/00 119/72 |

(Continued)

*Primary Examiner* — Craig J Price
(74) *Attorney, Agent, or Firm* — Wagenknecht IP Law Group PC

(57) ABSTRACT

The present invention provides a smart water flow apparatus capable of maintaining a desired level of water in a reservoir using sensor technology while having an override or shutoff feature that is programmable to address variations in water pressure or to prevent flooding due to sensor malfunction or power failure.

18 Claims, 9 Drawing Sheets

(56) References Cited

U.S. PATENT DOCUMENTS

| | | |
|---|---|---|
| 2012/0152374 A1 | 6/2012 | Hyrnes |
| 2015/0208609 A1* | 7/2015 | Tillet ................. A01K 7/02 119/74 |
| 2015/0237826 A1* | 8/2015 | Van Der Poel .......... A01K 7/02 119/74 |

* cited by examiner

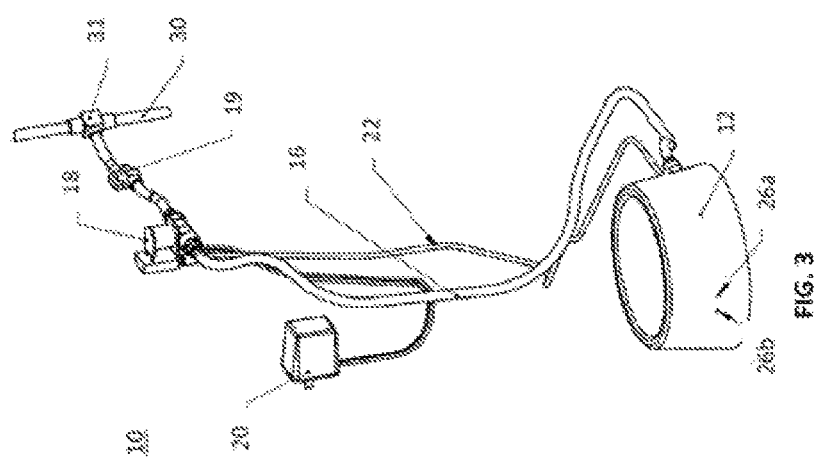

AUTOMATIC SMART WATERING APPARATUS

CROSS-REFERENCE TO RELATED APPLICATIONS

This is a continuation-in-part of U.S. patent application Ser. No. 13/334,005 filed Dec. 21, 2011, which is a continuation-in-part of U.S. patent application Ser. No. 11/997,194 filed Oct. 24, 2007, which claims benefit of priority to U.S. provisional patent application Ser. No. 60/862,714 filed on Oct. 24, 2006; each of which are herein incorporated by reference in their entirety.

FIELD OF THE INVENTION

The invention relates to a water refill systems and more specifically to a smart water flow apparatus that accurately refills a water reservoir from a variety of water pressures and provides overrides or shut offs in case of malfunction or should the apparatus topple over or malfunction.

BACKGROUND OF THE INVENTION

A variety of products currently exist on the market for providing drinking water for pets. Typically, pet owners provide a supply of drinking water to their pets by filling a reservoir, such as a bowl, with water and leaving the reservoir in a spot accessible by the pet. Once the pet consumes the entire contents of the reservoir, the reservoir needs to be manually refilled with water. The drawback of such products is that they require frequent, typically daily, replenishment by the owner. This presents a problem for owners who must leave their pets alone for periods of time.

Certain devices attempt to solve the above problem by providing alternative approaches for refilling the drinking water reservoir. For example, U.S. Pat. No. 6,971,331 issued to Rohrer, teaches water dispensing device having an open reservoir connected to a closed reservoir placed on top of the open reservoir, so that by force of gravity the water in the closed reservoir flows to and refills the open reservoir. A similar principle of gravity flow from a higher closed reservoir to a lower open reservoir is utilized in a device disclosed in U.S. Pat. No. 6,843,205 issued to Segreto. Such gravity flow devices have a number of important drawbacks. First, the continuous water flow lasts only as long as the top closed reservoir contains water. Therefore, such devices are typically large, heavy, and cumbersome, since they incorporate a large water container sitting on top of the lower open reservoir. Unless mounted to a wall or otherwise properly supported, such devices risk being overturned by and hurting the pet. Moreover, the gravity flow design does not eliminate the need to consistently refill the reservoir, it simply prolongs the time between refills. Once the top reservoir is depleted, so is the supply of water and the owner needs to refill the top reservoir in order to continue the water flow.

Other devices provide a reservoir which is connected to a continuous supply of water. Such devices use mechanical flow valves similar to those found in toilet tanks to regulate the flow of water from the source to the reservoir. One major drawback of such devices it that the flow valves are prone to failure, resulting in water overflow. Likewise, overflow results when a pet overturns the reservoir, since the water continues to flow even once the device is not in a horizontal position.

SUMMARY OF THE INVENTION

The present invention addresses the shortcomings of current water flow devices and provides related benefits. More specifically the present invention discloses a smart water flow apparatus capable of maintaining a desired level of fluid while incorporating shutoff features or overrides should the apparatus malfunction or should the apparatus be tipped over. The apparatus of the present invention is adaptable to a variety of water pressures and because of its shutoff or override capabilities may be used indoors or in a variety of situations without concern of significant flooding. Moreover, the present invention may be adapted to various flow rates should the water pressure from the primary source change such as during times of higher or lesser water pressure.

In one aspect of the invention a smart water flow apparatus is provided, which includes an open top reservoir having a sensor mechanism, the sensor mechanism having sensors that detect the presence or absence of fluid at a height, such as a sensor height, in the reservoir; a valve that regulates delivery of fluid from a fluid source into the reservoir; and a powered circuit communicatively coupled to the sensor mechanism to receive start and stop inputs and coupled to the valve to instruct opening and closing of the valve. The circuit is further characterized in that it measures time of filling the reservoir, generates a programed time by adjusting the time of filling the reservoir by a margin for error, and compares subsequent times of filling the reservoir to the programmed fill time. The circuit instructs the valve to close upon the first of either reaching the programmed fill time during subsequent fillings or upon receiving the stop information. For instance, if the stop sensor fails the programmed fill time operates as a backup to stop flow of fluid into the corresponding reservoir. Further, the circuit instructs the valve to open upon expiration of a predefined time delay after receiving the start input. Preferably, the reservoir is an open top bowl, such as for household pets. However, in other embodiments, the reservoir is a trough, such as for livestock or farm use.

In preferred embodiments, the sensor mechanism includes a stop sensor and a start sensor, where the stop sensor is positioned above the start sensor. The sensor mechanism also preferably includes a reference sensor positioned below the start sensor, optionally where the reservoir is dry or a water level is below the reference sensor in an unfilled state and an initial time for filling the reservoir for calculating the programmed fill time is measured from below or at the reference sensor to the stop sensor. Subsequent times of filling are typically measured between the start sensor and the stop sensor or between below the start sensor and the stop sensor. Typically, the subsequent time of filling is overwritten upon each subsequent filling. In some embodiments subsequent times of filling are stored in a database for later access, which permits analysis of various times, volumes or frequency of watering. Preferably the valve is selected from the group consisting of an electromechanical valve, a solenoid valve, and a mechanical valve.

In some embodiments, the circuit is positioned at or on the reservoir. In other embodiments the circuit is remote from the reservoir. The circuit can be powered by any suitable power supply, such as a battery or an AC to DC power supply converter. Preferably, the circuit measures time of filling for generating the programmed fill time at start up or restart of the apparatus only if the sensor mechanism detects the absence of fluid, where the presence of fluid at start up or reset initiates a default time for comparison with one or more subsequent times of filling. This may occur when the apparatus is reset or if power failure has occurred. The default time may vary depending on the size of the reservoir, but 95 seconds can be used as initial guidance for a reservoir in the form of a pet bowl. In some embodiments the circuit forms part of a microcontroller.

By providing a time delay, the apparatus can be configured to permit a pet to finish or substantially finish drinking from the reservoir before refilling the reservoir. The time delay can be defined by the manufacturer or defined by the user using an adjustment, which increases or decreases the time delay.

When intended for home use, the apparatus can provided as a smart water flow kit including the smart water flow apparatus, an installation coupling for coupling the apparatus to a continuous water source, and instructions for assembly and use.

The smart water flow apparatus may also include a visual indicator capable of displaying one or more indications. Preferably at least one indication is a learning mode, which indicates the apparatus is or is ready to conduct an operation such as measuring time of initial filling and calculating the programmed fill time. A second indication can also be provided, such as for a power outage detected indication, which indicates the apparatus is operating under a default fill time as reference and not the programmed fill time. The visual indicator can include any suitable display, such as a liquid crystal display (LCD), one, two or more light emitting diodes (LEDs) or other similar indicators.

The apparatus can also be adapted into a system for providing water to a plurality of reservoirs. As an example, in a related aspect the invention also includes a smart water flow system, which includes a plurality of open top reservoirs, each associated with a sensor mechanism capable of detecting the presence or absence of a fluid at a height in the reservoir, such as a sensor height; a valve system characterized as a plurality of valves capable of regulating delivery of fluid into each of the plurality of reservoirs; and a powered circuit operably connected to the sensor mechanisms to receive start and stop inputs for each reservoir and coupled to the valve system to instruct opening and closing of valves for delivery of the fluid into each reservoir. In such embodiments, the circuit can measure time of filling of at least one reservoir, generate a programed fill time by adjusting the time of filling the at least one reservoir by a margin for error, and compare subsequent times of filling of each of the plurality of reservoirs to the programmed fill time. The circuit also instructs the valve system to close a valve for a corresponding reservoir upon reaching the programmed fill time during subsequent fillings of the reservoir and if receiving the stop information. Preferably, the circuit also instructs the valve to open upon expiration of a predefined time delay after receiving the start input for the corresponding reservoir.

A number of variations of the apparatus and systems can be provided in a number of embodiments. For instance, in some embodiments, the programmed fill time is generated from measuring time of filling of a plurality of reservoirs and averaging the time of filling across the plurality of reservoirs. Such times can be averaged using a mean or median approach to averaging. In another embodiment, the programmed fill time is generated from each of the plurality of reservoirs for comparison against subsequent times of filling of the corresponding reservoir.

BRIEF DESCRIPTION OF THE DRAWINGS

Embodiments of the invention can be better understood with reference to the following drawings, which are part of the specification and represent preferred embodiments. The components in the drawings are not necessarily to scale, emphasis instead being placed upon illustrating the principles of the invention. And, in the drawings, like reference numerals designate corresponding parts throughout the several views.

FIG. 3 depicts an elevated front view of the smart water flow apparatus 10 depicting the visual indicators 26a and 26b viewable from the outer surface of the reservoir 12. The continuous water supply line 16 and communication line are provided in the rear of the apparatus 10.

DETAILED DESCRIPTION OF THE INVENTION

For clarity of disclosure, and not by way of limitation, the invention is discussed according to different detailed embodiments; however, the skilled artisan would recognize that features of one embodiment can be combined with other embodiments and is therefore within the intended scope of the invention.

Unless defined otherwise, all technical and scientific terms used herein have the same meaning as is commonly understood by one of ordinary skill in the art to which this invention belongs. If a definition set forth in this document is contrary to or otherwise inconsistent with a well accepted definition set forth in the art, the definition set forth in this document prevails over a contradictory definition.

The invention includes a variety of smart flow systems that ensure appropriate delivery of fluid such as water to pets, livestock, wild life, and other animals. As an introduction, the smart flow apparatus 10 allows the monitoring of a fluid level in a reservoir 12 and automatically delivers additional fluid when depleted or sufficiently decreased. Preferably, the fluid is a liquid and in most instances will be water or a water solvent with nutrients. Since the apparatus 10 is connected or coupled to a continuous water or fluid source, the user is not required to refill reservoirs 12 or supply containers. In addition, an override or shutoff feature is provided to prevent spillage should the reservoir 12 be overturned or should the sensor mechanism 14 fail. Thus, the apparatus 10 and methods of the invention operate by detecting the presence or absence of fluid at one or more levels and regulating fluid flow in response to the fluid level. Since the apparatus 10 is a smart system, the apparatus 10 self-adjusts to a variations of water pressures and reservoir volumes.

As will be recognized, the apparatus 10 may be provided in a variety of embodiments depending on the particular needs of the user. If intended for home use, the apparatus 10 can be provided as a self-filling watering bowl for a pet. In these embodiments, the apparatus 10 ensures the pet's watering bowl is sufficiently filled with water at all times, yet provides a shut off feature for instances such as if the pet overturns the reservoir 12 or there is failure of the sensor mechanism 14. Thus, the apparatus 10 may be used indoors without significant concern of flooding.

Figure 1:
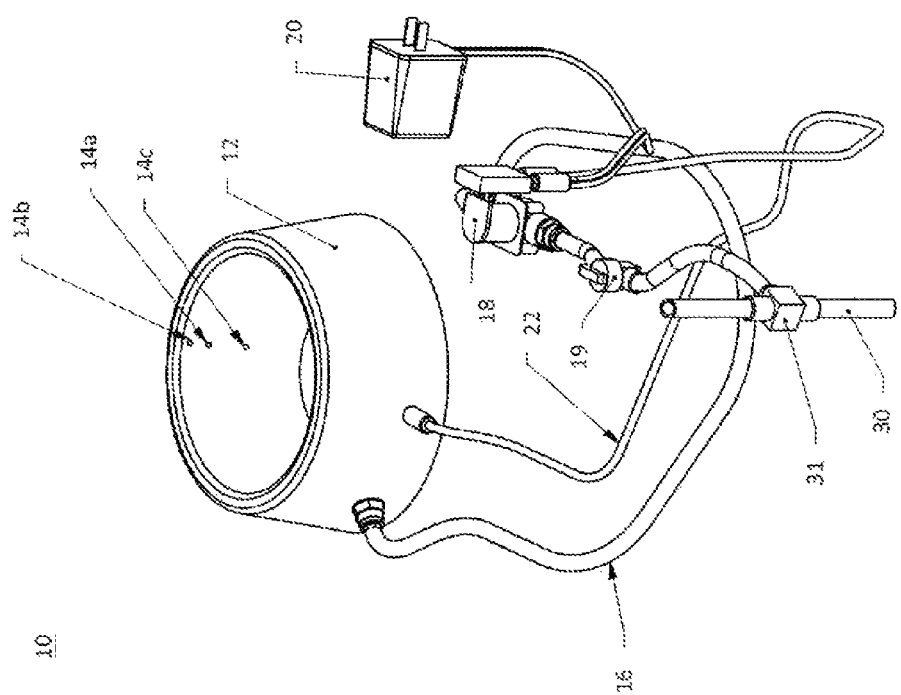
FIG. 1 depicts a smart water flow apparatus 10 including a reservoir 12 capable of retaining a fluid. A sensor mechanism 14 is shown in the form of a start sensor 14a, stop sensor 14b and reference sensor 14c positioned along the inner surface of the reservoir 12 such that when fluid fills the reservoir 12, the fluid will first contact the reference sensor 14c, then start sensor 14a then stop sensor 14b. Fluid is introduced into the reservoir 12 by a water supply line 16 and regulated via valves 18, 29 which regulate flow from a continuous water supply. In preferred embodiments valve 29 is used as a shut off as well as to regulate water pressure by partial closing. The apparatus 10 is powered by a power supply 20 and power is supplied via a power line 22.
Figure 2A:
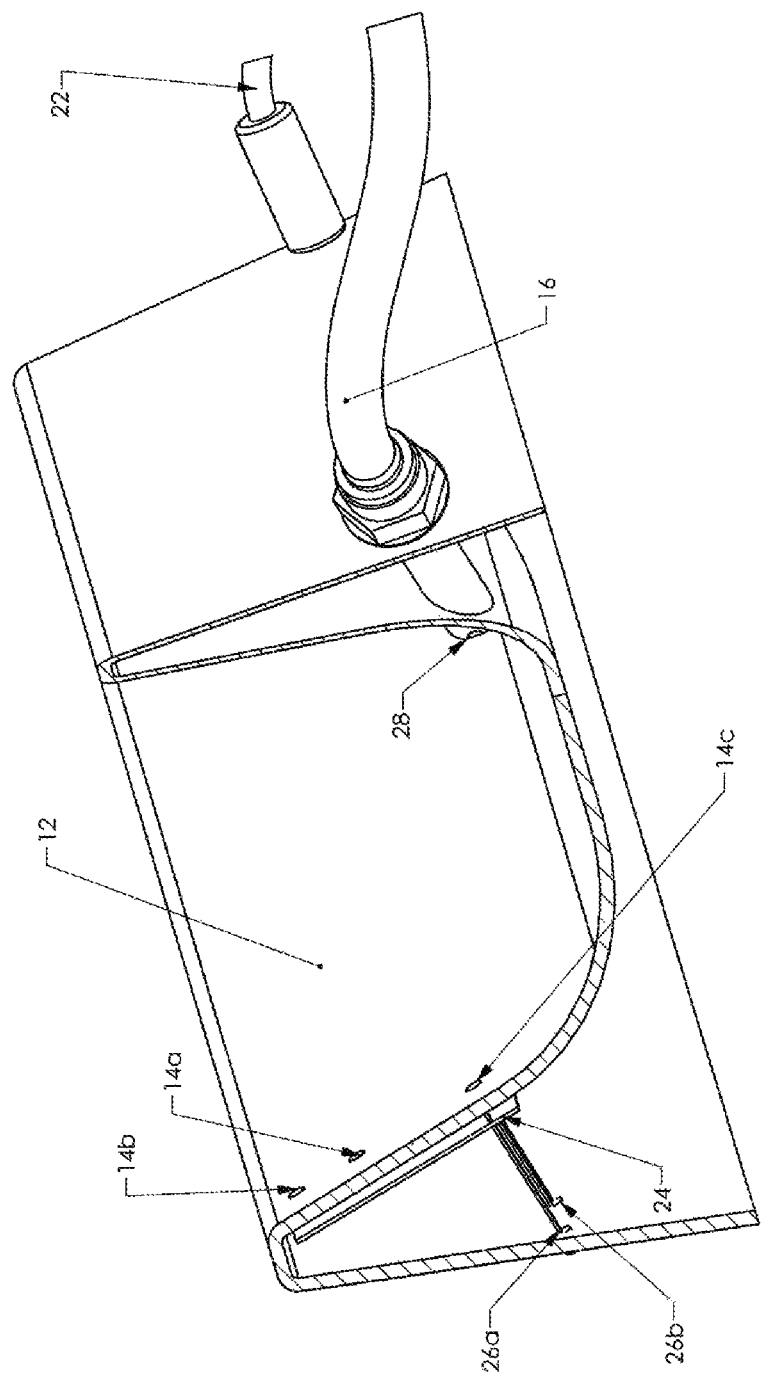
FIGS. 2A-2C demonstrate the electrical connection of the sensor mechanism 14 to a powered circuit 27a (FIG. 2B) or to a microcontroller 27b (FIG. 2C), which is depicted more generally as a printed circuit board 24 positioned within a dry portion of the reservoir 12 in FIG. 2A. Also depicted is the electrical communication with visual indicators 26a and 26b provided in the form of LEDs, and the flow path of a fluid through the water supply line 16 feeding into the reservoir 12 via an outlet port 28.
Figure 2C:
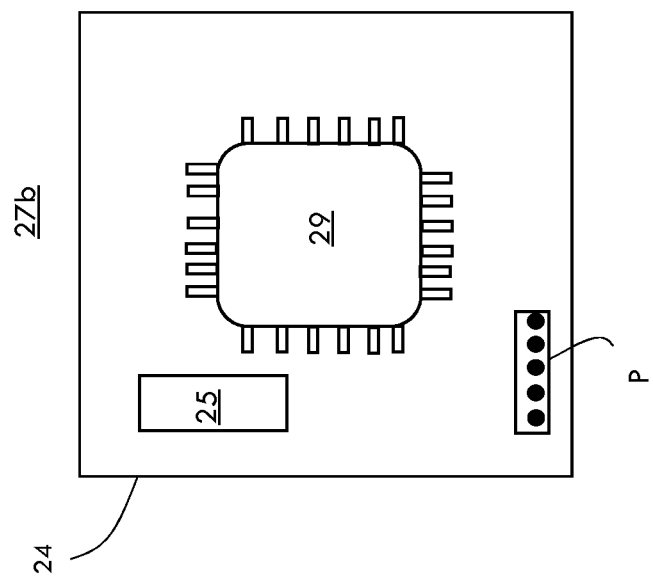
Figure 2B:
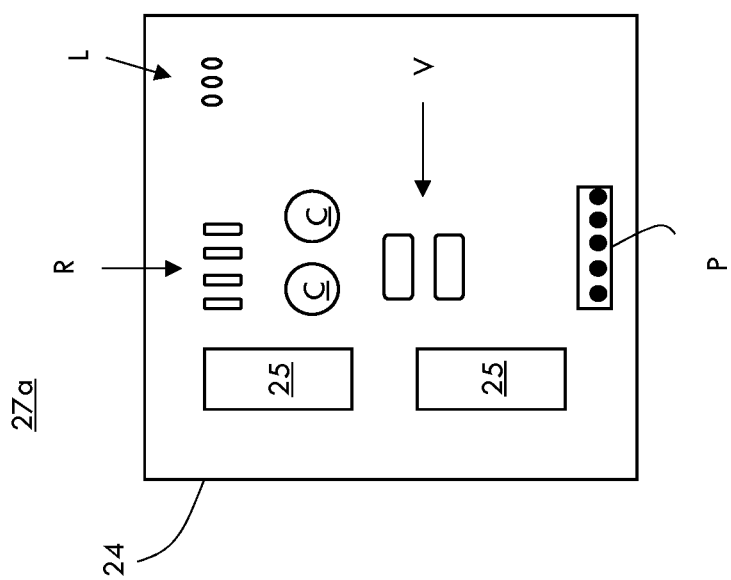
Figure 4:
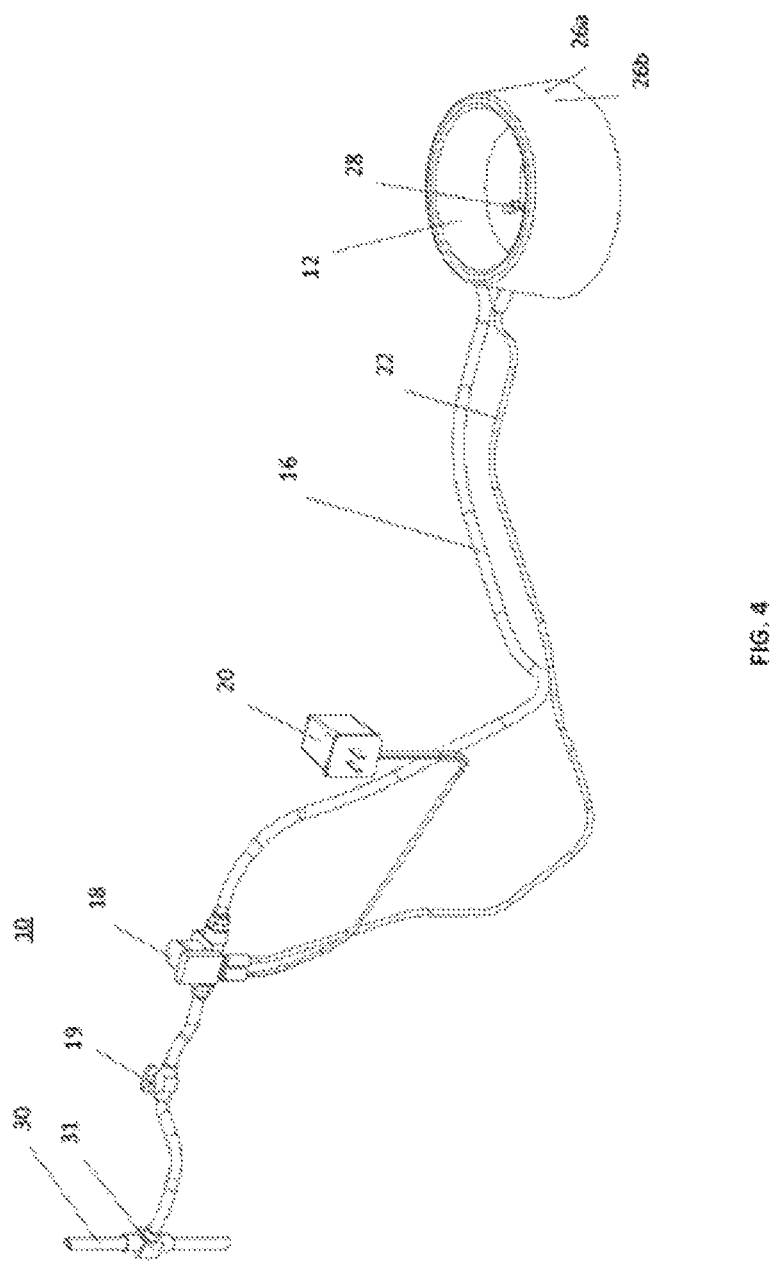
FIG. 4 depicts an elevated view of the smart water flow apparatus 10 and more clearly shows an outlet port 28 within the reservoir 12.
Figure 6:
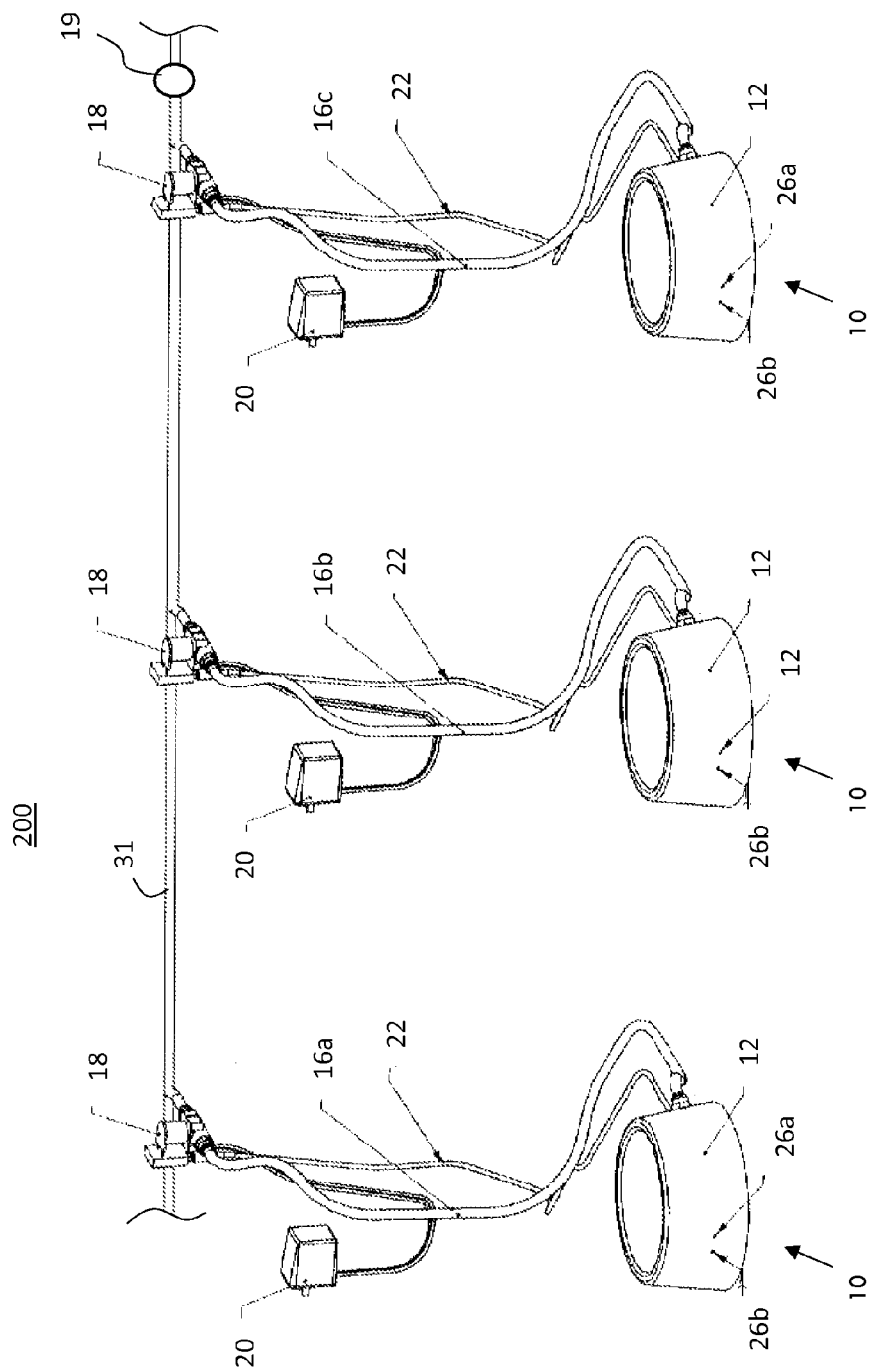
FIG. 6 depicts a smart water flow system 200, which incorporates a plurality of open top reservoirs 12 from a plurality of smart water flow apparatuses 10.

When used with veterinary or livestock situations, the smart flow apparatus 10 can be incorporated into a smart follow system 200 having related embodiments which deliver water or fluid to one or more of a plurality of water bowls, containers, troughs and other such vessels. Thus, as depicted in FIG. 6 and taken together with FIGS. 2A-C, each reservoir 12 within a plurality of reservoirs 12 may be have a sensor mechanism 14 to detect or monitor water or fluid level independent of other reservoirs 12, and thus the circuit 27a can regulate fluid or water flow to the particular reservoir 12 among the plurality of reservoirs 12. Water or fluid may be delivered via a series of water lines 16 coupled to a shared water supply line 31. Delivery of fluid through the water lines 16, 31 is performed using a plurality of valves 18, 19 of a valve system. The term "valve" is intended to encompass one valve, two valves or a plurality of valves as the skilled artisan will recognize that a valve system may vary depending on the particular needs of the user. In addition, one or more regulators independent of valves 18, 19 may be used to maintain a constant pressure for delivery to or through water supply lines 16. Similarly, the override shutoff feature may be tailored to each reservoir 12 independent of the additional reservoirs 12 to selectively shut off flow to a particular reservoir 12.

Referring to FIGS. 1-4 and 6, the reservoir 12 provides a structure, such as a cavity or concave surface, to retain one or more fluids such as water. A variety of reservoirs 12 known in the animal, veterinary and livestock arts may be adapted for use with in the smart apparatus 10. Nonlimiting examples include but are not limited to bowls, cups, dishes and troughs. Reservoirs 12 may be constructed using any suitable method desired by the user or as known in the material art to which it belongs, such as injection molding plastic. In other embodiments the reservoir 12 may be constructed using metal or metal alloy forming techniques, wood construction techniques and the like. Thus, the construction methodologies or materials of the reservoir 12 may include those used in the plastics industry, metal or metal alloy industry, woodworking industry, or other manufacturing industries. Furthermore the reservoir 12 may be impregnated or include a coating to prevent bacterial growth, algae growth, fungal growth, viral growth and the like such as but not limited to MICROBAN (Microban Int'l, North Carolina). When used in larger scale such as with livestock facilities the reservoir 12 may be constructed as known or contemplated in the livestock arts. Modifications of the reservoir 12 to mount or associate a sensor mechanism 14, circuit 24, visual indicator 26, water supply line 16, power line 22 or other accessory are also encompassed within the present invention. As not limiting examples, the reservoir 12 may be adapted with apertures, throughbores, counterbores, protrusions, complementary surfacing, quick disconnect fittings, and the other such surface features.

Referring to FIG. 2, in the preferred embodiment, the sensor mechanism 14 is attached to or integrated into the reservoir 12 such that the reservoir cavity, which retains the fluid, exposes a detecting region of the sensor mechanism 14. The sensor mechanism 14 communicates and thus relays its information generally in the form of inputs to the circuit 27a. In a preferred embodiment the circuit 27a is housed within the reservoir 12 such that it remains dry, even when the reservoir 12 is filled. Thus the circuit 27a is not directly exposed to the fluid but is protectively housed or spatially separated from the fluid. One or more apertures or a transparent region(s) may expose a portion of the sensor mechanism 14 to the fluid held within the cavity of the reservoir 12. The circuit 27a through its corresponding PCB 24 may be affixed to the inside of the reservoir 12 using any technique known or used in the electronics arts such as gluing or mating complementary surfaces, but is preferably screwed or riveted.

In some embodiments the reservoir 12 is provided remote from the valve 18 or circuit 27a. Remote reservoirs 12 may have particular utility in the livestock or veterinary arts where two or more reservoirs 12 are utilized. In these embodiments, the sensor mechanism 14 is associated with, such as affixed to or removably connected to the reservoir 12 and is capable of transmitting information, preferably in the form of inputs to the circuit 27a via appropriate communication cables, wireless connections and other communication approaches. Thus the sensor mechanism 14 may transmit a signal in response to the presence or absence of a fluid from the reservoir 12 to the circuit 27a and the circuit 27a may in turn provide instructions to the valve 18 through a power line 22. Although depicted individually in FIGS. 1, 3 and 4, the power line 22 and water supply line 16 may be sheathed together along at least a portion of a shared distance. In addition, the power line 22 may provide electrical power from the valve 18 to the circuit 27a. Thus the power line 22 may allow the circuit 27a and sensor mechanism 14 to operate using power routed from a same power supply 20. Routing may occur by providing power from the power supply 20 to the valve 18 and routing sufficient power from the valve 18 to the circuit or to the circuit 27a then to devices connected to the circuit 27a. Thus the power line 22 should provide sufficient power to operate the circuit 27a and the sensor mechanism 14, and optionally visual indicators 26 and the other accessories of interest. Techniques for routing power through a plurality of devices are well known in the electrical arts.

In some embodiments the apparatus 10 is provided as a single housed unit with all elements closely associated. However, in these embodiments the reservoir 12 may be detached for ease of cleaning then reattached to the water supply line 16. Similarly, the reservoir 12 may be interchanged such as to provide a larger or smaller reservoir 12. Detaching the reservoir 12 may send an additional signal to prevent flow of fluid from the valve 18 or an additional shutoff valve may be provided. In preferred embodiments, a quick disconnect fitting having a shutoff valve is used for connection to the reservoir 12 to prevent outward flow of water from the reservoir 12 during removal of the water supply line 16. Alternatively or in addition, detaching the reservoir 12 may prevent the transfer of an input from a start sensor 14*a* to the circuit or may lock the apparatus 10 in a "no fill" or error mode.

The sensor mechanism 14 is operably connected to the circuit 27*a* and acts a detection system for relaying the status of the reservoir 12 to the circuit 27*a*. More specifically, the sensor mechanism 14 detects the presence or absence of a desired fluid and electrically signals the circuit 27*a* when the fluid is sufficiently low. The circuit 27*a* electrically communicates with the valve 18. Thus the presence or absence of a fluid such as water results in transfer of instructions that open or close the valve 18 and thus increase or decrease water flow to the reservoir 12. When using a plurality of reservoirs 12, preferably each reservoir 12 includes a sensor mechanism 14. In this instance each sensor mechanism 14 may communicate with a shared circuit 27*a*, albeit with functionality that manages flow to each the plurality of reservoirs 12 independently.

The sensor mechanism 14 can utilize a variety of sensing technologies but frequently operate by providing a switching signal such as depressing a button, closing a circuit or opening a circuit. The sensor mechanism 14 can operate by measuring pH or detecting a change in pH to signal the presence or absence of fluid. Preferably, the sensor mechanism 14 operates by measuring or detecting conductivity of water contacting the sensor mechanism 14. In a preferred embodiment the sensor mechanism 14 includes at least two sensors 14*a*, 14*b*. One being a start sensor 14*a*, and another being a stop sensor 14*b*. In the preferred embodiment the stop sensor 14*b* is positioned above the start sensor 14*a*. Most preferably the start sensor 14*a* sends signal inputs to the circuit 27*a* to start the flow of fluid when the absence of fluid is detected. When fluid or water contacts the stop sensor 14*b*, water flow is halted through communication between the stop sensor 14*b*, circuit 27*a* and valve 18, which causes the valve 18 to close. In some embodiments flow of fluid or water is stopped when a closed circuit is formed between the stop 14*b* and start sensor 14*a* via electrical conduction through an electrically conductive media such as water. In additional embodiments a reference sensor 14*c* acts as a ground and is preferably positioned below the stop sensor 14*b* and the start sensor 14*a*. Most preferably, both start 14*a* and stop sensors 14*b* output a square wave. When a conductive fluid such as water contacts the reference (ground) sensor 14*c* and a start 14*a* or stop sensor 14*b*, the square wave at that sensor 14*a*, 14*b* is partially grounded, or diminished in amplitude which the circuitry detects. Operationally, an initial fill time is established (and is always greater than a subsequent fill time) because the distance from the bottom of the bowl to the stop sensor 14*b* is physically greater than the distance from the start sensor 14*a* to the stop sensor 14*b*, therefore requiring more time. Configuring the communication between the sensor mechanism 14, circuit 27*a* and valve 18 may be performed using techniques known to artisans in the electrical engineering arts and as discussed herein.

The skilled artisan will appreciate that one of the key features of the apparatus is the redundant control of the valve 18 by the circuit 27*a*. Ordinary control of the valve 18 (e.g. water solenoid valve) is handled by inputs received from start and stop sensors 14*a*, 14*b*. These sensors 14*a*, 14*b* signal the circuit 27*a* to begin operations for turning the valve 18 on or off. However, if the stop sensor 14*b* was to accumulate enough dirt or contaminants such that it no longer made clean contact with the water in the bowl/reservoir 12, the stop sensor's 14*b* signaling to the circuit to close the valve 18 (such as to de-energize a water solenoid valve 18) may be jeopardized. This could result in the bowl/reservoir 12 endlessly overflowing. To prevent this from occurring, a secondary or redundant control function is implemented. This is accomplished by using a timer to count how many seconds are required in the time of filling the bowl/reservoir 12 the first time power is applied. This count, in seconds, is then multiplied by a factor greater than 1, such as 1.1, 1.25, 1.5 or other suitable factor as a margin for error, and stored as the programmed fill time, which is also referred to as an "auto learned time." On any subsequent filling of the bowl/reservoir 12, a fill timer is started and compared to the programmed fill time. Both the stop sensor 14*b* (primary control) and the fill timer versus programmed fill time (secondary control) are monitored, and either control has the ability to signal the circuit 27*a* to stop the water flow. The stop sensor 14*b* (primary control) will signal a halt to the water flow when the reservoir 12 is full. The fill timer (secondary control) that times subsequent filling will signal the circuit 27*a* to halt the water flow when the fill timer equals or exceeds the programmed fill time. Therefore, in order for the reservoir 12 to overflow both control systems would have to fail, which is highly unlikely.

Turing back to the sensor mechanism 14 for use with the apparatus 10, the skilled artisan will appreciate that a variety of sensors are known in the electrical, mechanical and spectroscopic arts, which may be used or adapted for use with the apparatus 10 and systems 200 of the invention. Thus any sensor capable of detecting the presence or absence of a desired fluid such as water is encompassed within the invention. Moreover, the sensor mechanism 14 may incorporate one or more of a variety of sensors. In one embodiment, the sensor mechanism 14 incorporates a sensor that detects pressure. For example an increase in pressure, caused by the presence of a fluid, may press against and therefore activate a sensor. Furthermore a drop in pressure, such as by the absence of a fluid, may release pressure from the sensor or provide an alternative signal. Thus pressing or releasing the sensor would signify the presence or absence of a fluid. In another embodiment, the sensor utilized detects the presence or absence of anions or cations. In this embodiment the H+ or OH— from the auto-ionization of water may cause a detectable change in charge. In addition the dissociation of salts such as Na+ and Cl— may increase the conductivity of water. Thus the detection of cations or anions such as through the use of a cathode sensor or an anode sensor can demonstrate the presence of water and the absence of such charge demonstrates the absence of water. These sensors are typically constructed from metal or metal alloy and are known in the chemical and electrical arts. In still another embodiment, the sensing mechanism 14 includes one or more sensors that include a hygroscopic disc that swells in the presence of water and shrinks as it dries out. Thus, the swelling of the disc demonstrates the presence of water and the dried out configuration demonstrates the absence of water. The swelling of a hygroscopic disc may be used to press a button or complete an electrical circuit and its drying may release the button or cause a temporary break in the electrical circuit. In yet another embodiment an optical sensor detects at least one optical property in the surrounding vicinity and signals the circuit 24 accordingly. Thus changes in optical properties between air and a fluid can signal the circuit 27*a* to conduct operations to open or close the valve 18.

When using a plurality of reservoirs 12 it is preferred to also incorporate a plurality of sensor mechanisms 14, each associated with one corresponding reservoir 12 and operably connected to a powered circuit for regulating flow of fluid through a series of water lines 16 and valves 18, 19 into each reservoir 12 independent of other reservoirs 12. Thus the circuit may be operably connected to many sensor mechanisms 14 and capable of instructing the opening or closing of a plurality of valves 18.

Fluids are preferably delivered from a continuous water source to the reservoir 12 via the water supply line 16. The water supply line 16 is generally tubular and may be constructed from any material sufficiently strong to maintain flow from the water source to the reservoir 12. Examples of suitable materials include polymer plastic, polypropylene, metal, metal alloy, steel, galvanized steel or metal, copper and the like. The water supply line 16 may feed into a series of water lines to further distribute fluid to a plurality of reservoirs using a plurality of valves.

The water supply line 16 may have an adapter at one end for permanently or reversibly coupling the water supply line 16 to plumbing fixtures such as pipes, water lines 30, spigots, hoses and other couplers. Thus installation of the apparatus to the continuous water source, such as city or locally supplied water, may involve the connection of the water supply line 16 to the continuous water supply using techniques known in the plumbing arts and may utilize a variety of connectors 31, sealants, O-rings, valves 29, quick connect/disconnect fittings, or other such structures. At the opposing end, the water supply line 16 may have a coupling for irreversibly or reversibly coupling the water supply line 16 to the reservoir 12 such as to enable the reservoir 12 to be removed or interchanged with a different reservoir 12. Techniques for coupling tubular structures or devices to tubular structures are well known in the art and are thus encompassed within the present invention. Couplings may include quick disconnect couplings such as those that disconnect via pushing a release button and pulling at least one of the connected structures. Naturally such couplings may include one or more O-rings to properly seal any connections. In further embodiments a one way valve is present within the coupling to prevent excessive water or fluid spillage upon disconnection.

In other embodiments, the water supply line 16 is inserted through a through bore or aperture within the reservoir 12 and allowed to deliver fluid or water to the reservoir 12 through an outlet port 28 without physical connection to the reservoir 12. In other embodiments the water supply line 16 is inserted through one or more through bores and the area around the water supply line 16 sealed such as through the use of a sealant to form an outlet port 28. In yet additional embodiments the continuous water supply line 16 is draped over the reservoir 12 or held in place over the reservoir 12 to permit delivery of fluid to the reservoir 12. The adapter may be a quick connect or quick disconnect coupling.

A filter may be positioned along the path of the water supply line 16, such as between valves 18, 29. The filter may be used to capture or prevent passage of sediment, sand, rust, zinc, cadmium, chlorine, copper, mercury or other elements found in water supplies. The filter may be based on an activated carbon medium, ion exchange medium, reverse osmosis or other mediums applicable for use with water filtration.

The flow of fluid or water is regulated via the valve 18. The valve 18 receives its instructions from the circuit 27a, which is in electrical communication with the sensor mechanism 14. Valves 18 typically operate by opening, closing or partially obstructing passageways via the manipulation of discs or rotors. The valve 18 may regulate flow into the reservoir 12 by opening, closing or partially obstructing the water supply line 16 at either end or within a central region depending on the user's needs. The valve 18 may fluidly connect to the continuous water source and water supply line 16 and thus regulate flow of fluid into the water supply line 16. Thus, the positioning of the valve 18 is nonlimiting so long as the flow of fluid may be regulated. The valve 18 may be a single valve or a plurality of valves in series or parallel. Depending on the user's needs, the valve 18 may include a one way valve, such as to prevent backflow or a two or three way valve to permit directional flow of fluid or water to one or more of a plurality of reservoirs 12. The valve 18 is intended to be non-limiting and may be a mechanical valve or an electromechanical valve.

In the preferred embodiment the valve 18 is a solenoid valve. A solenoid valve is an electromechanical valve controlled by running or stopping an electrical current through a solenoid, which in essence is a coil of wire, thus changing the state of the valve. Thus the solenoid valve allows easy manipulation of flow by controlling the presence or absence of current such as by electrical interaction with the circuit 27a. Often a spring is used to hold the valve closed and the delivery of an appropriate electrical signal such as current opens the valve 18. Stopping the flow of current or opening a circuit may allow the spring to close the valve 18. Solenoid valves offer fast and reliable switching and may incorporate plunger type actuators, pivoted-armature actuators, rocker actuators and other actuators.

The circuit 27a is a powered integrated circuit incorporating basic structures known the electrical arts, which can include memory 25, resistors R, capacitors C, transistors, voltage regulators V, LED indicators L, electrical connectors P, traces and other electrical components used in the fabrication of integrated circuits or interfaces. The circuit 27a can be analog, part analog part digital, but is preferably digital. The circuit 24 can be mostly digital with an analog timer. Most preferably, the circuit 24 is in the form of a microcontroller 27b. A microcontroller 27b is in essence, a computer on a chip. The microcontroller is typically positioned on a printed circuit board (PCB) 24 as known in the electrical arts along with appropriate electrical contacts, conductors, nonconductors, traces and the other circuit elements. In addition to arithmetic and logic elements of a general purpose microprocessor 29, the microcontroller 27b usually includes features such as a microprocessor 29, memory 25 that is read only and read/write and input/output interfaces. By reducing the size, cost and power consumption compared to a traditional microprocessor 29, memory 25 and input/output devices, microcontrollers 27b make it more economical to electronically control processes. However, one skilled in the art would also recognize the apparatus 10 may utilize a microprocessor 29 with substitutable peripheral devices such as memory 25, timers and the like, which is intended to be encompassed within the term microcontroller 27a. Thus as used in the present invention, the term "microcontroller" refers to the microprocessor 29 and any needed peripherals, inputs/outputs to perform the desired functions, such as measuring or monitoring time, recording such measurements in memory, comparing measurements, receiving electrical signals from the sensor mechanisms 14 and sending instructions to the valve 18. Thus, the microcontroller 27b used with the present invention may automatically control the opening and closing of the valve 18 such as by directing or preventing electrical current to the valve 18 in response to signal received by the sensor mechanism 14 and closing the valve 18 in response to the expiration of a programmed fill time.

In the preferred embodiment, the microcontroller 27b is capable of recording a programmed fill time into memory 25, monitoring the time that the valve 18 remains open in a subsequent fillings, comparing these times and upon expiration of the programmed fill time, instructing the valve means 18 to close. Thus the microcontroller 27b (or circuit 27a) is capable of storing a programmed fill time, which refers to the time required to fill the reservoir 12 and capable of monitoring the time in which fluid is delivered during regular operation, which is the subsequent fill time or time of subsequent filling. These times are compared to ensure the time of subsequent filling does not exceed the programmed fill time to prevent significant flooding or significant spillage of the reservoir's 12 contents. These functions can be performed using logic functions and programming techniques well known in the electrical or computer arts.

As an overview of operation, the apparatus 10 is initially set up for monitoring by allowing the apparatus to generate a programmed fill time as an override for sensor mechanism 14 malfunction. It can also be initiated through a reset command. Set up is accomplished by having the circuit 27a determine the initial time of filling then multiplying the value by a margin for error. The initial time of filling is measured until the stop sensor 14b is reached by the fluid. Accordingly, the apparatus 10 can be self-programmed for a variety of water pressures. In preferred embodiments the initial time of filling is to the time it takes for the fluid to rise from the reference sensor 14c to the stop sensor 14b. The multiplied product is set as the programmed fill time for comparison against times of subsequent filling. In some embodiments the method includes providing the reservoir 12 in a dry or unfilled state, instructing the opening of the valve 18, measuring the time it takes to fill the reservoir 12 until the stop sensor 14b is reached, multiplying the value by a margin for error, and storing in memory the product as the programmed fill time.

Accordingly, the circuit 27a includes a programmable timer either integrated with the circuit 27a or in communication with the circuit 27a. The programmable timer may be a mechanical timer but preferably operates via integrated circuit and/or digital logic as known in the electrical and computer arts. Similarly, the programmable timer may be implemented by loaded software as known in the electrical and computer arts in suitable embodiments.

Following set up, the circuit 27a through communication with the sensor mechanism 14, detects the presence or absence of water at a desired height. If the absence of water is detected, preferably at the start sensor 14a, the circuit 27a instructs the valve 18 to open after a predefined time delay, which is set in consideration of the time it generally takes for a pet to finish drinking. In some embodiments, the start input is sent by detecting the absence of water at the start sensor 14a. In this approach the reservoir can be significantly emptied before beginning the filling cycle. In other embodiments, the start input is sent by detecting the absence of water at the stop sensor 14b. In this approach the valve 18 continually tops off the reservoir 12. In either embodiment, if the stop sensor 14b detects the presence of water, the circuit 24 instructs the valve 18 to close thereby preventing overflow of water. In addition, the circuit 24 or microcontroller instructs the valve 18 to close upon the expiration of the programmed fill time, which again is generated by adjusting the time of initial filling by a margin for error.

The time of subsequent filling is compared to the programmed fill time by either measuring the time of subsequent filling and comparing the value to the programmed fill time or by setting a counter to the programmed fill time and permitting the counter to count down, which automatically sends a stop signal upon reaching zero. When measuring the time of subsequent filling, it is defined as the time it takes to fill the reservoir up to the stop sensor 14b upon starting a filling cycle. Thus in either approach the circuit 27a or microcontroller 27b monitors the amount of time that the valve 18 remains open and may shutoff or instruct the valve 18 to close upon expiration of the programmed fill time independent of a stop input from the sensor mechanism 14 during subsequent filling. Again, this override feature permits the apparatus 10 to prevent spillage due to a malfunctioning sensor or if the reservoir 12 has been tipped over such as by a pet, livestock, weather condition, or other accident. Thus the override feature permits the apparatus 10 to shut off fluid flow if the programmed fill time expires prior to the fluid reaching the stop sensor 14b. The times of subsequent filling may be recorded in memory for future analysis or may be overwritten each time with a new time of subsequent filling. Recording times of subsequent filling permits consumption to be closely monitored over various periods. In the preferred embodiments the instruction to stop fluid flow is given priority over an instruction to start or continue water flow.

In the preferred embodiments, the circuit 27a communicates using transfer of electrical signal. Thus, the preferred embodiments will require a power source such as a power supply 20. The power supply 20 may be adapted from current technologies such as AC/DC converters such as those that convert 120 volts AC to 12 volts DC or to other suitable voltage and amperage. In other embodiments the power supply 20 is a battery pack. The power supply 20 may be housed together with the circuit 27a or may be housed or provided separately. Thus power may be delivered from the power supply 20 via one or more power supply lines 22 or traces. Such techniques for providing sufficient power are well known in the electrical arts and well with the skill of the ordinary artisan.

A power outage detection feature is preferred for instances when the power source may be removed and then restored. A challenge presented with power outages is that when power is restored, the apparatus 10 enters the set up or auto learn mode, and attempts to measure the time of filling to ultimately generate a new programmed fill time. Since the reservoir 12 is already full, a time of filling of zero seconds would be erroneously assigned as a programmed fill time, which would prevent subsequent filling from occurring. One approach of preventing this is that prior to entering the set up or auto learn mode, the circuit performs a power outage detection by checking to see if the bowl/reservoir 12 is full at power up. If it is, the circuit assigns a default fill time, typically an average fill time derived by filling several bowls at different water pressures, for comparison to at least one time of subsequent filling. Currently a default fill time of 95 seconds is used for the pet version. Normal operation of the apparatus 10 resumes, and a power outage detected LED indication is given. This LED indication lets the user know that the apparatus 10 is using a default fill time, and not an auto learned fill time. The remedy for this is to empty the reservoir 12 and cycle the power as soon as convenient, allowing the apparatus 10 to auto learn the initial fill time and generate a programmed fill time. Another approach is to incorporate a microcontroller with brownout detection, which distinguishes between a normal reset, such as at power up, or a brownout.

As eluded to above, in various embodiments, the apparatus 10 may include visual indicators 26, which offer a variety of display options for the user. The visual indicators 26 provide information regarding the status of the apparatus. Examples of visual indicators include any used in appliances or known in the electrical arts, such as low wattage lights. In some examples a series of LEDs (light emitting diodes) are used. The series of LEDs may include the same color or different colors and may include visual indicia above or below at least one of the LEDs. The following is a non-limiting example of an embodiment incorporating two LEDs. In this example, there are two LEDs, red and green, which provide indications as follows:

| Indication | Red | Green |
|---|---|---|
| Power Off | Off | Off |
| Power On | On | Off |
| Water Off | On | Off |
| Water On | On | On |
| Auto Learn Mode | On | Flashing |
| Auto Learn Error | Flashing | On |
| Power Outage Detected | Flashing | Off |
| Time Out Error | Flashing | Flashing |

Referring to the above indications, the power on or power off indication refers to whether the apparatus 10 is turned on or off. The water on or water off indication refers to whether the valve 18 is in an open position or in a closed position and thus whether fluid is being delivered. The learn mode indication refers to the apparatus 10 is in the process of or ready to generate a programmed fill time. The power outage detected indication is a condition when upon activation or turning on the power, the circuit 27a determines the reservoir 12 is already full, such as in the case where the stop sensor 14b detects the presence of fluid or water. The time out error indication is a condition the programmed fill time is reached during subsequent filling. In such instances, the logic function of the circuit 27a will terminate water flow by instructing the valve 18 to close and declare an error condition.

In the preferred embodiment the time out error indication discussed above will cause the logic function of the circuit 27a to prevent or prohibit water flow via instructing the valve 18 to remain closed and providing the appropriate visual indication on the LED indicators. This error will require operator intervention to clear. If the time out error occurred due to a dirty sensor, the sensor must be cleaned. In further embodiments, the power must be turned off or the device unplugged then turned on again to restart the process.

Another challenge that was overcome in the development of the smart water apparatus 10 is a condition where a pet is drinking while a normal fill cycle is occurring. The problem is that if the pet drinks fast enough and long enough to prevent the water level from rising to the stop sensor 14b, the programmed fill time could expire, causing the bowl or reservoir 12 to shut down in an error condition. The most likely scenario for this condition to occur would happen after the pet walks away with the water level just above the start sensor 14a. When the pet, or another pet returns and starts drinking, the water level quickly drops below the start sensor 14a, the normal fill cycle begins, and competes with the drinking pet for time of subsequent filling.

To prevent this situation from occurring, a predefined time delay, currently four minutes, is started when the water level drops below the start sensor 14a. When the minute time delay expires, the circuit 27a instructs normal refilling of the reservoir. This time delay allows the pet to drink as much as desired and walk away, or to drink the bowl dry and walk away.

Another challenge that was overcome was that after the addition of the delay of normal fill cycle function, as outlined above, it is possible for the normal fill cycle to be required to fill an empty bowl. At that point, the normal fill cycle time would equal the auto learned fill time, which could cause a time out error. Additionally, if the water pressure has degraded since the auto learn took place, the normal fill cycle time would exceed the auto learned fill time, definitely causing a time out error.

To prevent this situation from occurring, when measuring the time of initial filling during set up or auto learn mode the timed value is multiplied by a margin for error, such as 1.25 before storing as the programmed fill time. At 125% of the empty bowl fill time, the programmed fill time is inherently greater than a time of subsequent filling thereby ensuring a comfortable margin for error.

In some embodiments the apparatus 10 includes water pressure degradation analysis function. An example of such programming is accomplished by continuing to monitor or compare subsequent fill times. By incorporating such a feature the smart water apparatus 10 can continue to adjust timers in response to variations in water pressure.

Although the apparatus 10 has been primarily discussed with respect to a single reservoir 12, the above can also be adapted into a system 200 for providing water to a plurality of reservoirs 12. For example, the invention also includes a smart water flow system 200, which includes a plurality of open top reservoirs 12, each associated with a sensor mechanism 14 capable of detecting the presence or absence of a fluid at two or more heights in the reservoir 12; a valve system characterized as a plurality of valves 18 capable of regulating delivery of fluid into each of the plurality of reservoirs 12; and a powered circuit 27a operably connected to the sensor mechanisms 14 to receive start and stop inputs for each reservoir 12 and coupled to the valve system to instruct opening and closing of valves 18 for delivery of the fluid into each reservoir 12. In such embodiments, the circuit 27a can measure time of filling of at least one reservoir 12, generate a programed fill time by adjusting the time of filling the at least one reservoir by a margin for error, and compare subsequent times of filling of each of the plurality of reservoirs 12 to the programmed fill time. The circuit 27a also instructs the valve system to close a valve 18 for a corresponding reservoir 12 upon reaching the programmed fill time during subsequent fillings of the reservoir 12 and if receiving the stop information. Preferably, the circuit 27a also instructs the valve 18 to open upon expiration of a predefined time delay after receiving the start input for the corresponding reservoir 12.

A number of variations of the apparatus and systems can be provided in a number of embodiments. For instance, in some embodiments, the programmed fill time is generated from measuring time of filling of a plurality of reservoirs 12 and averaging the time of filling across the plurality of reservoirs 12. Such times can be averaged using a mean or median approach to averaging. In another embodiment, the programmed fill time is generated from each of the plurality of reservoirs 12 for comparison against subsequent times of filling of the corresponding reservoir.

Figure 5A:
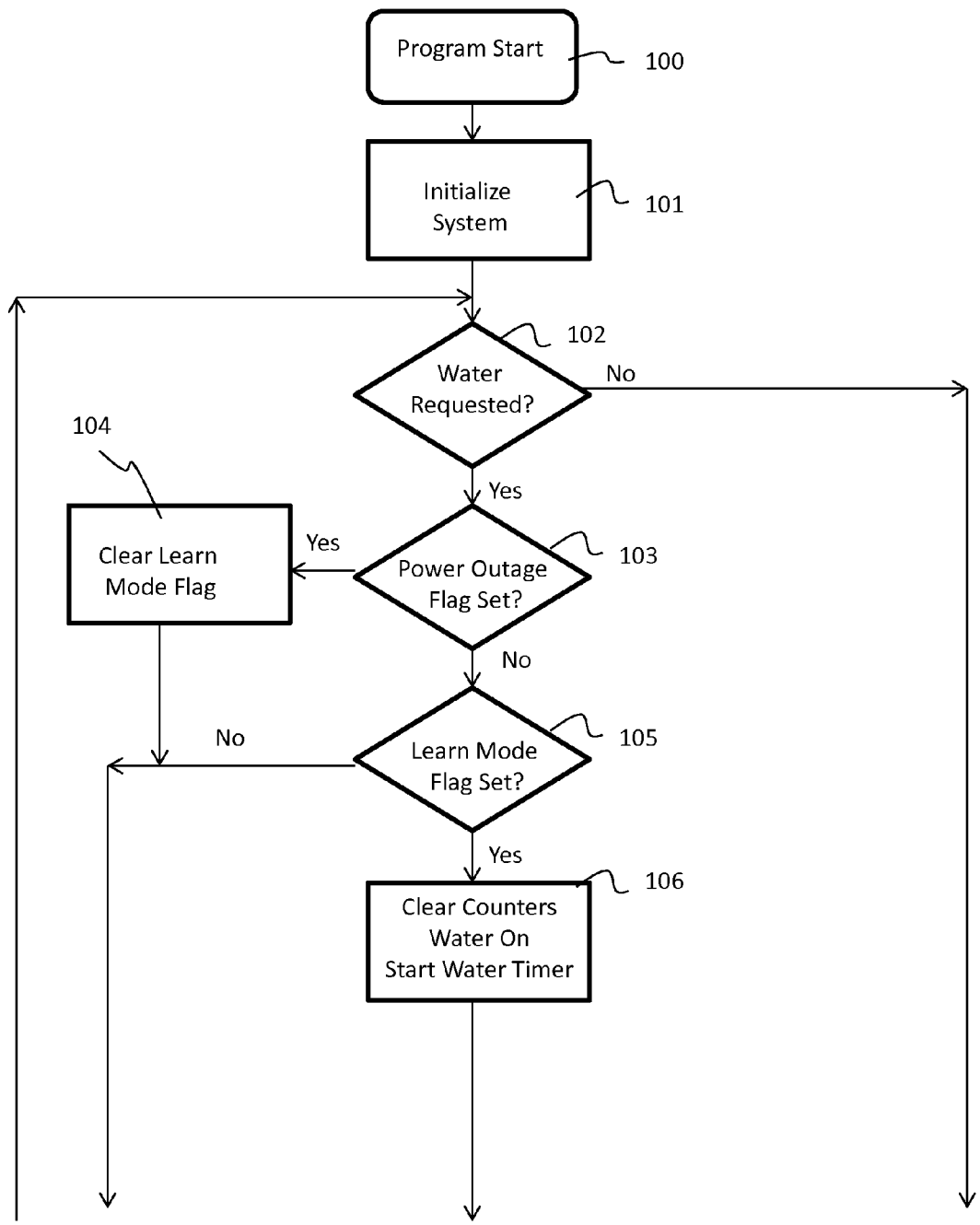
FIGS. 5A-C provide a flow chart depicting an exemplary method of operation of the circuit.
Figure 5B:
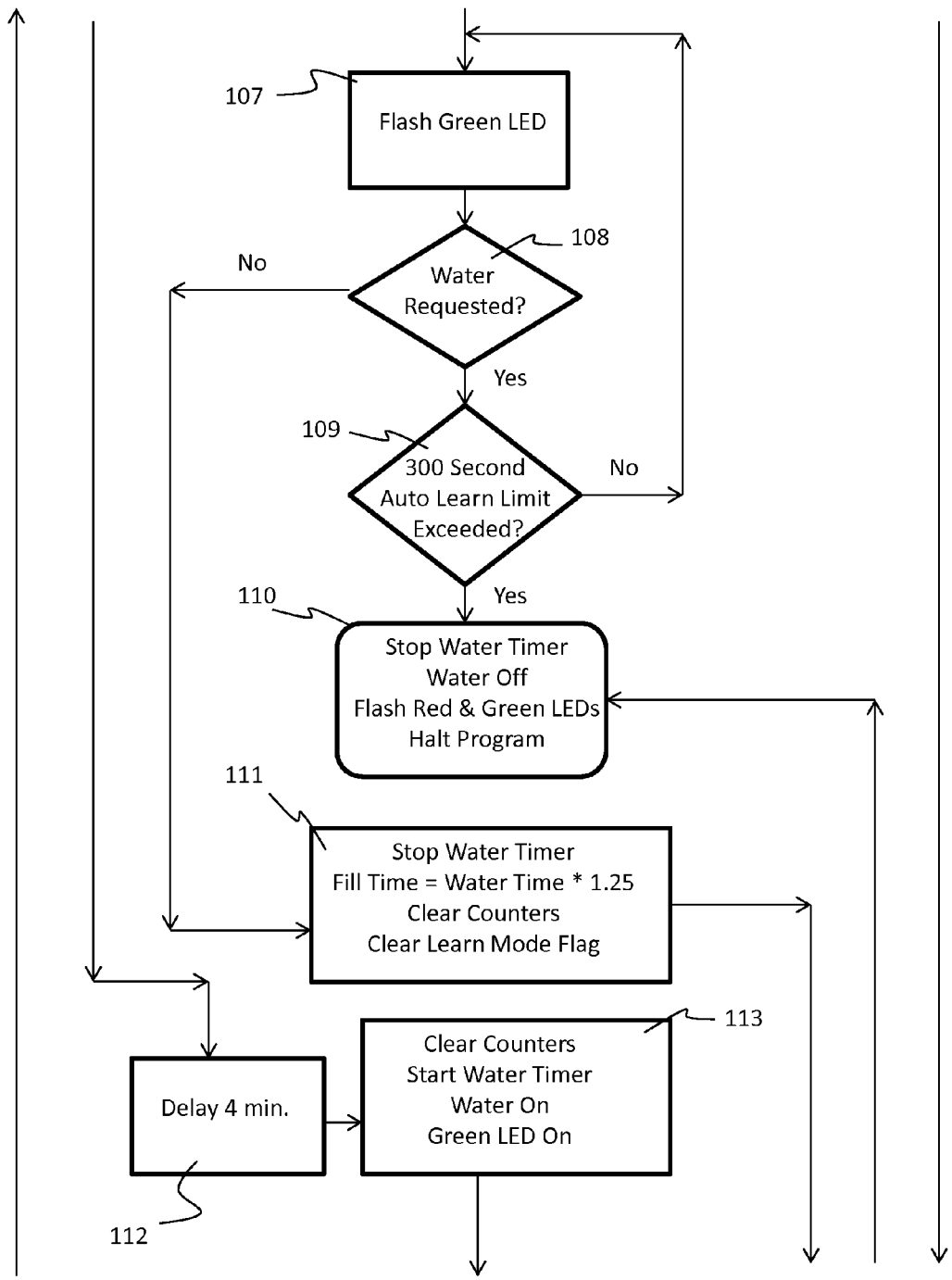
Figure 5C:
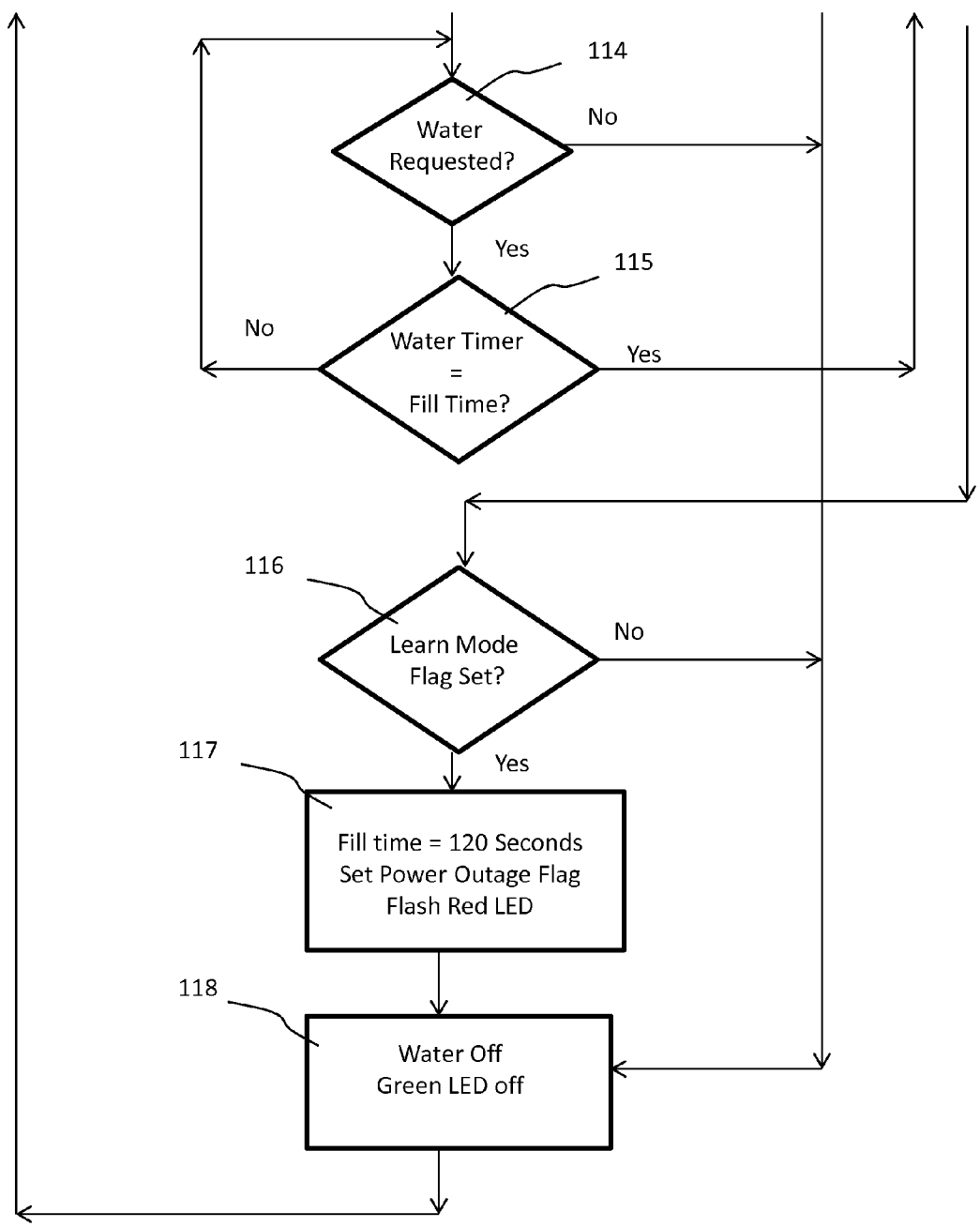

Example 1: Measuring Time of Initial Filling, Generating of a Programmed Fill Time, Measuring Time of Subsequent Filling, and their Comparison to Provide a Watering System with Redundant Protective Features With reference to a preferred method depicted in FIGS. 5A-C, an exemplary program control starts at 100 and initializes the system at step 101. At 102 the Start Sensor is read to determine if water is requested. If water is not requested, control transfers to 116 where the Learn Mode Flag is tested. If the Learn Mode Flag is not set, control transfers to 118 where water is ensured to be off as well as the green LED, and the program restarts after System Initialization. If the Learn Mode Flag is set then a Power Outage has occurred or the bowl was full at startup, and control transfers to 117, where the Programmed Fill Time is set to a default time of 120 seconds, the Power Outage Flag is set, and the red LED is flashed. Control then transfers to 118 where water is ensured to be off as well as the green LED, and the program restarts after System Initialization.

Back at 102, if water is requested, control transfers to 103 where the Power Outage Flag is tested. If the Power Outage Flag is set then the Learn Mode must not occur, so control transfers to 104 where the Learn Mode Flag is cleared. If the Power Outage Flag is not set, control transfers to 105 where the Learn Mode Flag is tested. If the Learn Mode Flag is not set, control joins the output of 104 and transfers to 112, where 4 minutes are delayed prior to transferring control to 113 where a Normal Fill Cycle begins by clearing the counters, starting the Water Timer, turning on the water and the green LED.

Back at 105, if the Learn Mode Flag is set, control transfers to 106 where the Auto Learn Mode begins by clearing the counters, turned on the water, and turning on the water timer. Control transfers to 107 where the green LED is flashed. Control transfers to 108 where the Stop Sensor is read to determine if water is still requested. If water is still requested, control transfers to 109 where the 300 second Auto Learn Limit check is made. If the 300 second Auto Learn Limit has not been reached control transfers to 107 where the Auto Learn Mode continues. If the 300 second Auto Learn Limit has been reached then a Time Out Error has occurred, and control transfers to 110, where the Water Timer is stopped, the water is turned off, the red and green LEDs are flashed, and program control stops.

Back at 108 if water is no longer requested then the Auto Learn Mode has successfully completed, and control transfers to 111 where the Water Timer is stopped, multiplied by 1.25, and stored in memory as the Programmed Fill Time. The counters are cleared and the Auto Learn Mode Flag is cleared. Control transfers to 118 where water is ensured to be off as well as the green LED, and the program restarts after System Initialization.

Back at 113 where a Normal Fill Cycle has begun, control transfers to 114 where the Stop Sensor is read to determine if water is still requested. If water is no longer requested, program control transfers to 118 where water is ensured to be off as well as the green LED, and the program restarts after System Initialization. If water is still requested, control transfers to 115 where the Water Timer is compared to the Programmed Fill Time to ensure a flood does not occur in the event of a dirty Stop Sensor. If the Water Timer does not equal the Programmed Fill Time, control transfers back to 114 where the Normal Fill Cycle continues. If the Water Timer does equal the Programmed Fill Time then a Time Out Error has occurred, and control transfers to 110, where the Water Timer is stopped, the water is turned off, the red and green LEDs are flashed, and program control stops.

Example 2: Circuit for a Smart Water Flow Apparatus

Provided below is an exemplary programming schematic of a main circuit incorporating subroutines for a smart water flow apparatus. The circuit provides for initial setup and testing to determine whether or not to initiate a learn mode, where the learn mode establishes a programmed fill time in the form of a Fill Seconds Counter for comparison to subsequent fill times. The Fill Seconds Counter is shown as being generated from a measured fill time (Seconds Counter) multiplied by a margin for error of 1.25.

The circuit also demonstrates measuring and comparison of subsequent fill times in the form of a Subsequent Fill Frequency Timer against the Fill Seconds Counter. A predefined time delay of 4 minutes is also provided between subsequent fillings. Still further, the circuit also demonstrates exemplary modules for water pressure degradation analysis and for monitoring water consumption.

```
MAIN PROGRAM START
Exec: program start
    initialize system - call SysInit
Exec0: water requested?
    set Start Sensor Flag
Exec1: Start Sensor tested?
    if Start Sensor not tested
        wait here
    endif
    if Water On not requested
        test for bowl full at startup - jump to Exec13
    endif
    if Power Outage flag not set
        test for Learn Mode - jump to Exec2
    endif
    reset Power Outage Flag
    reset Learn Mode Flag
Exec2: water requested, no Power Outage, test for Learn Mode
    if Learn Mode Flag not set
        start fill cycle - jump to Exec6
    endif
    clear Counters
    Water Valve on
    set Start Timer Flag
Exec3: water requested, filling, Learn Mode set
    green LED flashing
    set Stop Sensor Flag
Exec4: test Stop Sensor
    if Stop Sensor not tested
        wait here
    endif
    if Water On not requested
        Learn Mode completed successfully - jump to Exec5
    endif
    if Fill Seconds Maximum Time not expired
        continue filling - jump Exec3
    endif
    reset Start Timer Flag
    Learn Mode error termination - jump to Exec12
Exec5: Learn Mode completed successfully
    reset Water On Flag
    reset Timer Start Flag
    reset Learn Mode Flag
    Fill Seconds Counter = Seconds Counter * 1.25
    clear Counters
    Normal Cycle Termination - jump to Exec14
Exec6: subsequent fill cycle requested, learn mode clear, delay 4 minutes
    delay 4 minutes
    clear Counters
    set Timer Start Flag
    Water Valve on
    Green LED On
    start Subsequent Fill Frequency Timer
Exec9: test Stop Sensor
    Set Stop Sensor Flag
    if Stop Sensor not tested
        wait here
    endif
    if Water On not requested
        Normal Cycle Termination - jump to Exec14
    endif
    reset Water On Flag
    if One Seconds Counter < Fill One Seconds Counter
```

-continued

```
        Continue testing Stop Sensor - jump Exec9
    endif
Exec11: Time Out Cycle Termination, Red & Green LEDs alternately
flashing
    Water Valve off
    Red & Green LEDs alternately flashing
    stop Subsequent Fill Frequency Timer
    repeat - jump to Exec11
Exec12: Auto Learn Cycle Error Termination, Green LED on, Red LED
flashing
    Water Valve off
    Green LED on
    Red LED flashing
    repeat - jump to Exec12
Exec13: Water not requested, if Learn Mode reset then power outage or
bowl full at startup
    if Learn Mode Flag not set
        Normal Cycle Termination - jump to Exec14
    use Default Fill Time – Fill Seconds Counter = Fill Seconds
    Maximum
    set Power Outage Flag
    Red LED flashing
Exec14: Normal Cycle Termination
    Water Valve off
    Green LED off
Exec15: Water Pressure Degradation Analysis
    if Fill Seconds Counter < Previous Fill Seconds Counter – 2
        Fill Seconds Counter = Fill Seconds Counter – 1
    elseif Fill Seconds Counter > Previous Fill Seconds Counter + 2
        Fill Seconds Counter = Fill Seconds Counter + 1
    endif
    log Fill Seconds Counter as Previous Fill Seconds Counter
Exec16: Water Consumption Analysis
    stop Subsequent Fill Frequency Timer
    log Subsequent Fill Frequency time for Water Consumption analysis
    start over - jump to Exec0
            MAIN PROGRAM END
```

```
            EXTERNAL INTERRUPT SERVICE ROUTINE START
ExtInt: perform System Clock functions, test Start & Stop Sensors if
requested
    Save Status Register
    increment 1/2 Milliseconds Counter
    if Timer Start Flag not set
        Start Sensor Test requested? - jump tp ExtInt0
    endif
    if 1/2 Milliseconds Counter < 200
        Start Sensor Test requested? - jump to ExtInt0
    endif
    reset 1/2 Milliseconds Counter
    increment 100 Milliseconds Counter
    if 100 Milliseconds Counter < 10
        Start Sensor Test requested? - jump to ExtInt0
    endif
    reset 100 Milliseconds Counter
    increment 1 Seconds Counter
    if 1 Seconds Counter < 100
        Start Sensor Test requested? - jump to ExtInt0
    endif
    clear 1 Seconds Counter
ExtInt0: Start Sensor test requested?
    if Start Sensor Test not requested
        Stop Sensor Test requested? - jump to ExtInt1
    endif
    delay until high phase midpoint reached
    read Start Sensor Analog/Digital Converter - call RdAdcStr
    clear Start Sensor Flag
    exit Interrupt Service Routine - jump to ExtInt2
ExtInt1: Stop Sensor test requested?
    if Stop Sensor Test not requested
        exit Interrupt Service Routine - jump to ExtInt2
    endif
    delay until high phase midpoint reached
    read Stop Sensor Analog/Digital Converter - call RdAdcStp
    clear Stop Sensor Flag
ExtInt2: exit Interrupt Service Routine
```

-continued

```
    Restore Status Register
    return from interrupt
            EXTERNAL INTERRUPT SERVICE ROUTINE END
```

```
            READ START SENSOR ANALOG/DIGITAL
            CONVERTER (ADC) SUBROUTINE START
RdAdcStr: read ADC Start Sensor
    set ADC Multiplexer to Start Sensor
    enable ADC
    start ADC
RdAdcStr0: check for Start Sensor Conversion complete
    if Start Sensor Conversion not complete
        wait here
    endif
    save ADC Start Data Lo
    save ADC Start Data Hi
    if ADC Start Data Hi < ADC Hi Threshold
        reset Water On Flag
        reset Interrupt Flag
        return
    elseif ADC Start Data Lo < ADC Lo Threshold
        reset Water On Flag
        Reset Interrupt Flag
        return
    endif
    set Water On Flag
    reset Interrupt Flag
    return
            READ START SENSOR ANALOG/DIGITAL
            CONVERTER (ADC) SUBROUTINE END
```

```
            READ STOP SENSOR ANALOG/DIGITAL
            CONVERTER (ADC) SUBROUTINE START
RdAdcStp: read ADC Stop Sensor
    set ADC Multiplexer to Stop Sensor
    enable ADC
    start ADC
RdAdcStp0: check for Stop Sensor Conversion complete
    if Stop Sensor Conversion not complete
        wait here
    endif
    save ADC Stop Data Lo
    save ADC Stop Data Hi
    if ADC Stop Data Hi < ADC Hi Threshold
        reset Water On Flag
        reset Interrupt Flag
        return
    elseif ADC Stop Data Lo < ADC Lo Threshold
        reset Water On Flag
        reset Interrupt Flag
        return
    endif
    set Water On Flag
    reset Interrupt Flag
    return
            READ STOP SENSOR ANALOG/DIGITAL
            CONVERTER (ADC) SUBROUTINE END
```

```
            SYSTEM INITIALIZATION START
SysInit: system initialization
    clear Counters
    clear System Flags
    set Learn Mode Flag
    reset Timer Start Flag
    reset Power Outage Flag
    reset Water On Flag
    clear Fill Seconds Counter
    initialize External Interrupt to rising edge
    enable External Interrupt
    configure Port A inputs & outputs
```

-continued

```
configure Port B inputs & outputs
Red LED on
Green LED off
Water Valve off
clear Timer 1
set Output Compare Register 1A to 2Khz
set Output Compare Register 1A prescaler to 1
initialize Output Compare Register 1A to toggle on compare match
initialize Waveform Generator to clear timer on compare mode
initialize Analog/Digital Converter Multiplexer to Stop Sensor
clear Analog/Digital Converter Power Reduction
return
                    SYSTEM INITIALIZATION END
```

While the above description provides a variety of embodiments, the disclosure is intended to demonstrate nonlimiting adaptations that one of ordinary skilled in art would consider upon reviewing the disclosure. Thus various adaptations whether specifically disclosed or obvious to one of ordinary skill in the art upon reading the provided disclosure are intended to be encompassed herein. The present invention is not intended to be limited by scale or particular use.

What is claimed is:

1. A smart water flow apparatus comprising:
   a) an open top reservoir comprising sensors that detect a presence or absence of fluid at one or more heights in the reservoir;
   b) a valve that regulates delivery of fluid from a fluid source into the reservoir; and
   c) a powered circuit communicatively coupled to the sensors to receive start and stop inputs and coupled to the valve to instruct opening and closing of the valve, wherein:
      the circuit measures time of filling the reservoir, generates a programmed fill time by adjusting the time of filling the reservoir by a margin for error, and compares subsequent times of filling the reservoir to the programmed fill time,
      the circuit instructs the valve to close upon reaching either the programmed fill time during subsequent fillings or if receiving stop information, and
      the circuit instructs the valve to open upon expiration of a predefined time delay after receiving the start input.

2. The smart water flow apparatus according to claim 1, wherein the reservoir is a bowl or a trough.

3. The smart water flow apparatus according to claim 1, wherein the sensors comprise a stop sensor, a start-sensor, and a reference sensor, wherein the stop sensor is positioned above the start sensor and the reference sensor is positioned below the start sensor, further wherein the reservoir is dry or a water level is below the reference sensor in an unfilled state and an initial time for filling the reservoir for calculating the programmed fill time is measured from below or at the reference sensor to the stop sensor, further wherein subsequent times of filling are measured from at or below the start sensor and the stop sensor.

4. The smart water flow apparatus according to claim 1, wherein the valve is selected from the group consisting of an electromechanical valve, a solenoid valve, and a mechanical valve.

5. The smart water flow apparatus according to claim 1, wherein the circuit is positioned at or on the reservoir.

6. The smart water flow apparatus according to claim 1, wherein the subsequent time of filling is overwritten upon each subsequent filling.

7. The smart water flow apparatus according to claim 1, wherein the circuit is powered by a power supply comprising a battery or an AC to DC power supply converter.

8. The smart water flow apparatus according to claim 1, further comprising a visual indicator capable of displaying one or more indications, wherein at least one indication is a learning mode, further wherein the learning mode is characterized as measuring time of initial filling and calculating the programmed fill time.

9. The smart water flow apparatus according to claim 8, wherein a second indication is a power outage detected indication, which indicates the apparatus is operating under a default fill time and not the programmed fill time.

10. The smart water flow apparatus according to claim 9, wherein the visual indicator comprises two light emitting diodes.

11. The smart water flow apparatus according to claim 1, wherein the time delay is four minutes.

12. The smart water flow apparatus according to claim 1, wherein the filled reservoir at start up or after reset initiates a default time for comparison with the subsequent times of filling.

13. The smart water flow apparatus according to claim 12, wherein the default time is 95 seconds.

14. The smart water flow apparatus according to claim 1, further comprising memory for storing subsequent times of filling in a database for future analysis.

15. The smart water flow apparatus according to claim 1, wherein the circuit is a microcontroller.

16. A smart water flow system comprising:
   a) a plurality of open top reservoirs, each associated with a sensor capable of detecting a presence or absence of fluid at one or more heights in the reservoir;
   b) a valve system comprising a plurality of valves capable of regulating delivery of fluid into each of the plurality of reservoirs;
   c) a powered circuit operably connected to the sensor to receive start and stop inputs for each reservoir and coupled to the valve system to instruct opening and closing of valves for delivery of the fluid into each reservoir, wherein:
      the circuit measures time of filling of at least one reservoir, generates a programmed time by adjusting the time of filling the at least one reservoir by a margin for error, and compares subsequent times of filling of each of the plurality of filling reservoirs to the programmed fill time,
      the circuit system instructs the valve system to close a valve for a corresponding reservoir upon reaching the programmed fill time during subsequent fillings of the reservoir and if receiving stop information, and
      the circuit instructs the valve to open upon expiration of a predefined time delay after receiving the start input for the corresponding reservoir.

17. The smart water flow system according to claim 16, wherein the programmed fill time is generated from measuring time of filling of a plurality of reservoirs and averaging the time of filling across the plurality of reservoirs.

18. The smart water flow system according to claim 16, wherein the programmed fill time is generated from each of the plurality of reservoirs for comparison against subsequent times of filling of the corresponding reservoir.

* * * * *